United States Patent
Young (10) Patent No.: US 9,906,769 B1
(45) Date of Patent: Feb. 27, 2018

(54) METHODS AND APPARATUS FOR COLLABORATIVE MULTI-VIEW AUGMENTED REALITY VIDEO

(71) Applicant: RAYTHEON COMPANY, Waltham, MA (US)

(72) Inventor: Darrell L. Young, Falls Church, VA (US)

(73) Assignee: RAYTHEON COMPANY, Waltham, MA (US)

( * ) Notice: Subject to any disclaimer, the term of this patent is extended or adjusted under 35 U.S.C. 154(b) by 732 days.

(21) Appl. No.: 14/447,991

(22) Filed: Jul. 31, 2014

(51) Int. Cl.
*H04N 13/02* (2006.01)
*G06T 19/00* (2011.01)

(52) U.S. Cl.
CPC ....... *H04N 13/0207* (2013.01); *G06T 19/006* (2013.01); *H04N 13/0239* (2013.01)

(58) Field of Classification Search
CPC .................. H04N 13/0207; H04N 13/0011
See application file for complete search history.

(56) References Cited

U.S. PATENT DOCUMENTS

| | | | | |
|---|---|---|---|---|
| 8,509,521 | B2* | 8/2013 | Keating | H04N 13/0014 348/44 |
| 2008/0240499 | A1* | 10/2008 | Porikli | G06K 9/32 382/103 |
| 2009/0141941 | A1* | 6/2009 | Wagg | G06T 7/254 382/103 |
| 2010/0251287 | A1* | 9/2010 | Deshpande | G11B 27/036 725/32 |
| 2011/0199372 | A1* | 8/2011 | Porter | H04N 13/0011 345/419 |
| 2012/0327220 | A1* | 12/2012 | Ma | G06T 7/292 348/135 |
| 2013/0128034 | A1* | 5/2013 | Carr | G06K 9/00771 348/135 |
| 2016/0007058 | A1* | 1/2016 | Wang | H04N 21/23418 725/116 |

* cited by examiner

*Primary Examiner* — Mehrdad Dastouri
*Assistant Examiner* — Rowina Cattungal
(74) *Attorney, Agent, or Firm* — Lando & Anastasi, LLP (57) ABSTRACT

Methods and apparatus for producing multi-view 3D renderings of a scene, and collaboratively sharing information related to the renderings to facilitate producing synthetic viewpoints of the scene. In one example, a method of producing a 3D synthetic viewpoint of the scene includes receiving an image of the scene from a local camera, analyzing the image to determine a context of the scene and to extract at least one surface feature of the scene, developing an initial set of planar world coordinates for the image based on the at least one surface feature to estimate an initial local perspective projection matrix, and mapping image pixels of the image to a world plane to produce the 3D synthetic viewpoint of the scene by using the initial local perspective projection matrix to map image space coordinates to world coordinates.

15 Claims, 7 Drawing Sheets

METHODS AND APPARATUS FOR COLLABORATIVE MULTI-VIEW AUGMENTED REALITY VIDEO

BACKGROUND

There are numerous applications where it would be advantageous for a person to be able to view blocked scenes, for example, around corners, behind blocking structures, or inside buildings or other structures. Mounted mirrors are sometimes used to allow viewers to solve the blind corner problem. Large display screens are used at performance and sports venues to allow the audience better views of the stage, court, or playing field. Some systems include the use of remote cameras to assist in surveillance. However, conventional systems do not adjust the viewpoint, and therefore when a person uses a remote camera to "see" around corners, for example, the person may lose orientation due to the need to mentally translate the remote camera's view to his/her own viewpoint.

Events today are often simultaneously recorded by many cameras equipped with communications capability, yet there exists no method to facilitate rapid exchange of information to enable each user to collaborate with all others to yield a three-dimensional (3D) rendered scene with improved information of interest. Many conventional photogrammetric and computer vision techniques exist to extract 3D information from a multi-view set of information, but these techniques either require all users to share their views with all other users, or users post their collected views to a central server which then distributes the results. In either case, the communication and processing load can be an impediment to real time processing of information.

SUMMARY OF INVENTION

Aspects and embodiments are directed to systems and methods for providing camera users with the ability to view 3D renderings of a scene of interest, and also to dynamically form collaborative networks with other users to share information about the scene and thereby produce improved 3D renderings and multiple viewpoints of the scene.

According to one embodiment, a method of producing a three-dimensional (3D) synthetic viewpoint of a scene includes receiving an image of the scene from a local camera, the image including at least one vertical object, analyzing the image to determine a context of the scene and to extract at least one surface feature of the scene, developing an initial set of planar world coordinates for the image based on the at least one surface feature to estimate an initial local perspective projection matrix, and mapping image pixels of the image to a world plane to produce the 3D synthetic viewpoint of the scene by using the initial local perspective projection matrix to map image space coordinates to world coordinates.

The method may further include removing vertical distortion associated with the at least one vertical object by computing world coordinates of an intersection of the at least one vertical object with a surface corresponding to the surface feature using the initial local perspective projection matrix, and based on the world coordinates of the intersection and an estimated height of the at least one vertical object, projecting the vertical object onto a vertical plane. The method may further include in-painting the at least one vertical object on a horizontal plane with estimated background pixels.

In one example, computing the world coordinates of the intersection includes estimating image space coordinates of first and second features of the at least one vertical object, the first feature corresponding to the intersection of the at least one vertical object with the surface, estimating a midpoint of the first feature in world coordinates, and mapping the estimated image space coordinates of the first feature into world coordinates of the first feature using the initial local perspective projection matrix. Projecting the at least one vertical object onto the vertical plane may include projecting the at least one vertical object upright at the estimated midpoint of the first feature in the world coordinates. In one example, wherein the at least one vertical object is a person, estimating the image space coordinates of the first feature includes estimating the image space coordinates of feet of the person. The method may further include refining the initial local perspective projection matrix using image space coordinates of the midpoint of the first feature, the estimated world coordinates of the midpoint of the first feature, and the estimated height of the at least one vertical object to produce a refined local perspective projection matrix. In one example, the method further includes broadcasting the refined local perspective projection matrix.

In another example, the method further includes receiving at least one remote perspective projection matrix from a remote device, and updating the refined local perspective matrix using the at least one remote perspective projection matrix. In one example, the method is performed at a local device having a first viewpoint of the scene, and the remote device has a second viewpoint of the scene different from the first viewpoint of the scene. In this case, the method may further include, at the local device, producing an additional 3D synthetic viewpoint of the scene using the at least one remote perspective projection matrix received from the remote device, the additional 3D synthetic viewpoint including at least one object that is obstructed in the first viewpoint of the scene. In one example, receiving the at least one remote perspective projection matrix further includes receiving metadata associated with the at least one remote perspective projection matrix. In one example, receiving the metadata includes receiving at least one of timing information, descriptors of detected objects in the scene, and a position of the remote device. In another example, the method further includes computing local descriptors of objects in the image of the scene, and identifying an obstruction in the image of the scene based on the received descriptors of detected objects being different than the computed local descriptors. The method may further include processing the additional 3D synthetic viewpoint of the scene to render the obstruction at least partially transparent. The method may further include displaying the displaying the 3D synthetic viewpoint of the scene on a display associated with the local camera.

According to another embodiment, a method of collaboratively forming three-dimensional (3D) synthetic viewpoints of a scene includes obtaining a plurality of images of the scene with a corresponding plurality of cameras, at each of the plurality of cameras, producing a local 3D projection matrix, and broadcasting the local 3D projection matrix and associated metadata from each of the plurality of cameras to provide a corresponding plurality of broadcast data sets. The method further includes, for at least one of the plurality of cameras, receiving the plurality of broadcast data sets, selecting at least one of the broadcast data sets, processing the local 3D projection matrix and the at least one of the broadcast data sets to produce an updated 3D projection matrix, and processing the image of the scene obtained by the at least one of the plurality of cameras using the updated 3D projection matrix to produce a 3D synthetic viewpoint of the scene.

In one example, the method further includes broadcasting the updated 3D projection matrix. In another example, processing the image of the scene includes mapping image pixels of the image to a world plane to produce the 3D synthetic viewpoint of the scene by using the updated 3D projection matrix to map image space coordinates to world coordinates. In another example, for each camera of the plurality of cameras, the associated metadata includes an estimated position of the camera, an orientation of the camera, a field of view of the camera, and a resolution of the camera. In one example, selecting the at least one of the broadcast data sets includes determining a co-registration score between the at least one of the plurality of cameras and the camera associated with each of the plurality of broadcast data sets, and selecting the at least one of the broadcast data sets based on the co-registration score.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

The ability to record images and collaboratively operate on them in real time using "smart" devices enables a wide variety of new and useful applications. However, the ever-expanding envelope of possibilities can be overwhelming to the user unless they are tied directly to solving the user's needs in an intuitive, easy-to-use manner. Aspects and embodiments are directed to allowing a user to produce a three-dimensional (3D) reconstruction of a scene from a camera image of that scene, and to optionally augment the 3D reconstruction using information obtained from other users/cameras. The 3D reconstructions may be used to provide the user with a variety of selectable "synthetic viewpoints" (i.e., viewpoints that may be configured to be coincident with the user's own viewpoint, but which contain information not visible to the user's naked eye) that allow enhanced situational awareness. For example, the synthetic viewpoints may include viewpoints that give the effect of "seeing" around corners, inside or behind structures, etc. As discussed in more detail below, this effect may be achieved by rendering the 3D information on the user's display to the desired viewpoint and then using an alpha mask to make blockages transparent or semi-transparent. The user may select the synthetic viewpoint most useful to them at any time, and display that viewpoint using augmented reality glasses or smart phone camera display, for example. This ability has numerous applications, particularly in safety and security. For example, motorists may use the technology to "see" through blind spots such as are found at intersections or around busses or other large vehicles. The effortless situational awareness from having the camera viewpoint adjusted to match the viewpoint of the motorist allows him or her to avoid cross traffic collisions or striking pedestrians. Similarly, certain embodiments may provide security personnel, such as police or military personnel, the ability to "see" inside buildings while simultaneously maintaining exterior situational awareness. Conventional attempts to use video to "see" around corners do not adjust the viewpoint to be coincident with the user or render the blockage invisible using an alpha mask, and are therefore far less useful and more difficult to use.

As discussed above, conventional multi-view 3D rendering techniques require users to exchange complete frames of photographic information, which is both bandwidth and computationally intensive. Certain embodiments overcome this requirement by allowing each user to render the scene into a 3D format that is augmented by information from other views with minimal computation and communication burden. As discussed in more detail below, in some embodiments, although the 3D rendering may be improved when specific auxiliary information from other views is exchanged, the initial 3D rendering is not dependent on receipt of the auxiliary information. Thus, the initial 3D representation may be created from a single view without using the techniques conventionally associated with 3D reconstruction. The techniques described below are compatible with widely available cameras, such as those typically associated with mobile phones, and no special sensor is needed. Unlike conventional methods of multi-view 3D reconstruction, embodiments of the techniques disclosed herein do not require common pixels of the object to be located in the two or more views used for processing. The 3D reconstruction may be performed at the object level, not the pixel level.

According to certain embodiments, the exchange of information to improve the 3D renderings may be minimal. Additionally, the processing may be automatic and may require no user interaction other than to start the application on the user's device. As discussed in more detail below, after the application has been started, the user may choose to subscribe to a 3D rendered feed, or contribute to one or more feeds by collecting video of an event. Configuration of the application controls the feed(s) with which the user may choose to participate.

As discussed above, the user may obtain 3D renderings using only their own camera. However, in certain embodiments, the 3D renderings may be improved by using information obtained from other cameras. Improvement of the 3D representation may also improve the accuracy of virtual information inserted into the imaged scene. The number of collaborators/subscribers may make the service attractive to advertisers that may wish to insert specific information into the scene in a manner consistent with the 3D representation that is acceptable and even pleasing or enhancing of the scene content. The effect may be self-reinforcing in that as the content becomes more interesting more collaborators may choose to contribute and/or subscribe, thus attracting more interest from advertisers that may wish to add even more elaborate effects to simultaneously increase content attractiveness and communicate their product message.

Embodiments of the systems and methods disclosed herein may be useful in a wide variety of situations where users desire to know more information about their situational environment, such as bystanders at a parade, or concert, play, sporting event, political rally, protest, march, or any other type of event where additional information about the location and detail of the objects in the video are of interest. Furthermore, the ability to insert virtual information into the 3D rendered scene provides additional benefits and opportunities. For example, public safety officials may insert virtual instructions to help large crowds evacuate or avoid danger by displaying warning fences that can be viewed in real-time through the mobile phone camera.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

According to certain embodiments, various cues in a received image may be used to determine the context of the imaged scene, such as whether the scene is a street, stage, or playing field. For example, a color histogram of the image quickly distinguishes outdoor playing fields by predominance of green. The scene may also be examined for expected features, such as yard markers on fields, markers on courts, boundaries on a stage, or signs, stoplights, or markings on or near streets. Edge detection algorithms to estimate lines in an image in real time are commercially available for conventional smartphone cameras. After the context of the image has been determined with sufficient confidence, and surface features have been detected, an initial auto calibration may be performed to map image coordinates to world coordinates. At this point, a single user may enable a synthetic viewpoint based on the 3D reconstruction of the scene, but vertical objects are distorted. According to one embodiment, vertical distortion is removed by computing the world coordinates of the intersection of the vertical object with the surface using an initial projection matrix, as discussed further below. Initial refinement of single camera auto calibration may be achieved by using estimated heights of vertical objects. For example, the vertical object is segmented and projected onto a vertical plane using an assumed height. The object pixels in the horizontal plane may be replaced with typical pixels using in-painting.

This process allows a user with a single camera (such as their own smartphone) to achieve 3D rendering of a scene. However, as discussed above, significant improvements in the 3D reconstructions, synthetic viewpoints, and information available to users may be achieved by collaborating with other users and sharing information among two or more cameras that view at least portions of the same scene from different vantage points. According to one embodiment, the initial refined projection matrix computed at any camera is broadcast to a 3D collaborative network along with certain associated metadata. This metadata may include timestamps, positions, and image descriptors of detected objects. Participants receive projection matrices from other cameras which enables them to improve their own estimate of 3D information and improve their own projection matrix to yield an updated 3D projection matrix. This updated 3D projection matrix may be broadcast to the 3D collaborative network, allowing network participants to further improve their 3D information, and the processes may be iteratively repeated, as discussed further below.

Figure 1:
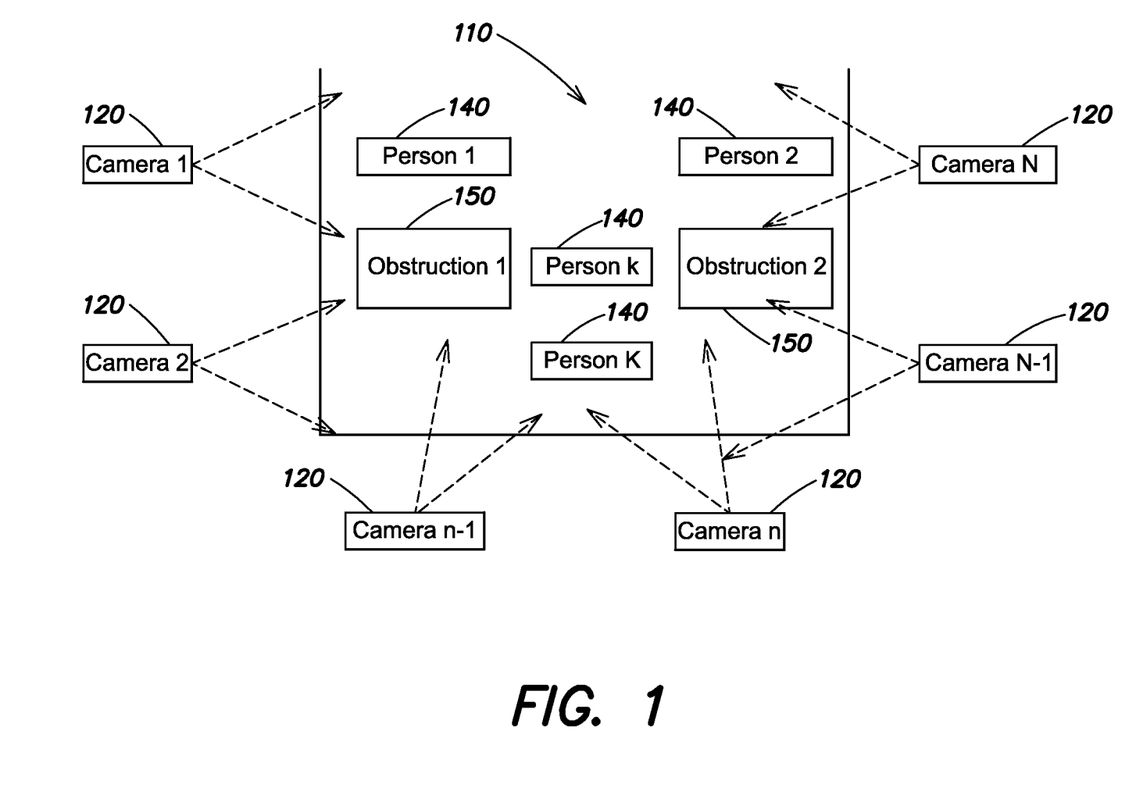
FIG. 1 is a block diagram of one example of a scene viewed by multiple cameras according to aspects of the invention.

As discussed above, an event of interest may occur on a stage, field, street, or other venue. FIG. 1 is a block diagram schematically illustrating an example of a scene or event including a venue 110. The event is observed by 1 to N cameras 120. According to one embodiment, no prior placement of the cameras 120 is assumed, and it is not necessary for cameras to be either stationary or moving. As discussed above, according to certain aspects, an important feature of the systems and methods discussed herein is the ability to reliably detect some identifying characteristic of the venue 110, such as yard markers on a football field, stage boundaries, or street markings, for example. This may be achieved without specified placement of the cameras 120. Any detected lines and/or other indicators, such as numeric markers on playing fields, for example, may be used to develop an initial set of planar world coordinates to estimate a perspective auto-calibration projection matrix, as discussed further below. Inside the event boundaries 130 are 0-K (K being a positive integer) upright objects 140, and one or more obstructions 150. In the illustrated example, the upright objects 140 are identified as people (e.g., for the case where the event is a sports event or performance); however, in other examples, the upright objects may be any of a wide variety of objects, not limited to persons. It is not necessary that all cameras 120 can see all objects/people 140. Indeed, an advantage of certain embodiments is the ability to allow users to "see" through obstructions 150 in a natural way using synthetic viewpoints and alpha masks to render the obstructions semi-transparent, as discussed further below.

The relationship between a point in the scene and its corresponding point in the camera and projector image coordinates can be written as, $$\begin{bmatrix} w^1 x^{p1} \\ w^1 y^{p1} \\ w^1 \end{bmatrix} = \begin{bmatrix} p_{11} & p_{12} & p_{13} & p_{14} \\ p_{21} & p_{22} & p_{23} & p_{24} \\ p_{31} & p_{32} & p_{33} & p_{34} \end{bmatrix} \begin{bmatrix} x^w \\ y^w \\ z^w \\ 1 \end{bmatrix} \quad (1)$$

$$\begin{bmatrix} w^2 x^{p2} \\ w^2 y^{p2} \\ w^2 \end{bmatrix} = \begin{bmatrix} q_{11} & q_{12} & q_{13} & q_{14} \\ q_{21} & q_{22} & q_{23} & q_{24} \\ q_{31} & q_{32} & q_{33} & q_{34} \end{bmatrix} \begin{bmatrix} x^w \\ y^w \\ z^w \\ 1 \end{bmatrix} \quad (2)$$

Or compactly, $$x^{p1} \cong P x^w \quad (3)$$

$$x^{p2} \cong Q x^w \quad (4)$$

In Equations (3) and (4), P and Q denote the projection matrix of two cameras, P and Q, respectively, and the superscripts p1 and p2 denote the pixel coordinate frames of the camera P and camera Q respectively. The notation $\cong$ indicates that the quantities are equal up to a scale factor.

Equation (1) and (2) can be written as:

$$\frac{w^1 x^{p1}}{w^2} = \frac{p_{11} x^w + p_{12} y^w + p_{13} z^w + p_{14}}{p_{31} x^w + p_{32} y^w + p_{33} z^w + p_{34}} \quad (5)$$

$$\frac{w^1 y^{p1}}{w^1} = \frac{p_{21} x^w + p_{22} y^w + p_{23} z^w + p_{24}}{p_{31} x^w + p_{32} y^w + p_{33} z^w + p_{34}} \quad (6)$$

$$\frac{w^2 x^{p2}}{w^2} = \frac{q_{11} x^w + q_{12} y^w + q_{13} z^w + q_{14}}{q_{31} x^w + q_{32} y^w + q_{33} z^w + q_{34}} \quad (7)$$

$$\frac{w^2 y^{p2}}{w^2} = \frac{q_{21} x^w + q_{22} y^w + q_{23} z^w + q_{24}}{q_{31} x^w + q_{32} y^w + q_{33} z^w + q_{34}} \quad (8)$$

Rearranging variables yields:

$$x^{p1}(p_{31} x^w + p_{32} y^w + p_{33} z^w + p_{34}) = p_{11} x^w + p_{12} y^w + p_{13} z^w + p_{14} \quad (9)$$

$$y^{p1}(p_{31} x^w + p_{32} y^w + p_{33} z^w + p_{34}) = p_{21} x^w + p_{22} y^w + p_{23} z^w + p_{24} \quad (10)$$

$$x^{p2}(q_{31} x^w + q_{32} y^w + q_{33} z^w + q_{34}) = q_{11} x^w + q_{12} y^w + q_{13} z^w + q_{14} \quad (11)$$

$$y^{p2}(q_{31} x^w + q_{32} y^w + q_{33} z^w + q_{34}) = q_{21} x^w + q_{22} y^w + q_{23} z^w + q_{24} \quad (12)$$

According to one embodiment, a perspective auto-calibration process solves for the projection matrix by factoring its terms into a vector, $$p_{11} x^w + p_{12} y^w + p_{13} z^w + p_{14} - x^{p1}(p_{31} x^w + p_{32} y^w + p_{33} z^w + p_{34}) = 0 \quad (13)$$

$$p_{21} x^w + p_{22} y^w + p_{23} z^w + p_{24} - x^{p1}(p_{31} x^w + p_{32} y^w + p_{33} z^w + p_{34}) = 0 \quad (14)$$

Rewriting Equations (13) and (14) into matrix form yields:

$$\begin{bmatrix} x^w & y^w & z^w & 1 & 0 & 0 & 0 & 0 & -x^{p1} x^w & -x^{p1} y^w & -x^{p1} z^w & -x^{p1} \\ 0 & 0 & 0 & 0 & x^w & y^w & z^w & 1 & -y^{p1} x^w & -y^{p1} y^w & -y^{p1} z^w & -y^{p1} \end{bmatrix} \begin{bmatrix} p_{11} \\ p_{12} \\ \vdots \\ p_{34} \end{bmatrix} = 0 \quad (15)$$

Given n correspondences (with n>6) between the points in the scene and the points in the image, $$\begin{bmatrix} x^w & y^w & z^w & 1 & 0 & 0 & 0 & 0 & -x^{p1} x^w & -x^{p1} y^w & -x^{p1} z^w & -x^{p1} \\ 0 & 0 & 0 & 0 & x^w & y^w & z^w & 1 & -y^{p1} x^w & -y^{p1} y^w & -y^{p1} z^w & -y^{p1} \\ \vdots & \vdots & \vdots & \vdots & \vdots & \vdots & \vdots & \vdots & \vdots & \vdots & \vdots & \vdots \\ x_n^w & y_n^w & z_n^w & 1 & 0 & 0 & 0 & 0 & -x_n^{p1} x_n^w & -x_n^{p1} y_n^w & -x_n^{p1} z_n^w & -x_n^{p1} \\ 0 & 0 & 0 & 0 & x_n^w & y_n^w & z_n^w & 1 & -y_n^{p1} x_n^w & -y_n^{p1} y_n^w & -y_n^{p1} z_n^w & -y_n^{p1} \end{bmatrix} \begin{bmatrix} p_{11} \\ p_{12} \\ \vdots \\ p_{34} \end{bmatrix} = 0 \quad (16)$$

Compactly, $$Bp = 0 \quad (17)$$

The vector p can be recovered using single value decomposition (SVD) related techniques, as will be appreciated by those skilled in the art, given the benefit of this disclosure. The SVD of matrix B yields matrices, U, D, and V, wherein where $B = UDV^T$. The last column of V, corresponding to the smallest singular value of B, contains the elements of the vector p, which can be reshaped to be the projection matrix P. A similar process may be followed to provide the projection matrix Q.

Once P and Q have been estimated, 3D reconstruction of the scene can be accomplished as follows.

Grouping like terms in Equations (9) and (10) provides, $$(p_{11} - x^{p1} p_{31}) x^w + (p_{12} - x^{p1} p_{32}) y^w + (p_{13} - x^{p1} p_{33}) z^w - (p_{14} - x^{p1} p_{34}) = 0 \quad (18)$$

$$(p_{21} - y x^{p1} p_{31}) x^w + (p_{22} - y^{p1} p_{32}) y^w + (p_{23} - y^{p1} p_{33}) z^w - (p_{14} - y^{p1} p_{34}) = 0 \quad (19)$$

$$(q_{11} - y^{p1} q_{31}) x^w + (q_{12} - x^{p1} q_{32}) y^w + (q_{13} - x^{p1} q_{33}) z^w - (q_{14} - x^{p1} q_{34}) = 0 \quad (20)$$

$$(q_{21} - y^{p1} q_{31}) x^w + (q_{22} - y^{p1} q_{32}) y^w + (q_{23} - y^{p1} q_{33}) z^w - (q_{24} - y^{p1} q_{34}) = 0 \quad (21)$$

The above Equations can be expressed in terms of homogeneous (world) coordinates:

$$M x^w = 0 \quad (22)$$

In Equation (22), $$M = \begin{bmatrix} p_{11} - x^{p1} p_{31} & p_{12} - x^{p1} p_{32} & p_{13} - x^{p1} p_{33} & p_{14} - x^{p1} p_{34} \\ p_{21} - y^{p1} p_{31} & p_{22} - y^{p1} p_{32} & p_{23} - y^{p1} p_{33} & p_{24} - y^{p1} p_{34} \\ q_{11} - x^{p1} q_{31} & q_{12} - x^{p1} q_{32} & q_{13} - x^{p1} q_{33} & q_{14} - x^{p1} q_{34} \\ q_{21} - y^{p1} q_{31} & q_{22} - y^{p1} q_{32} & q_{23} - y^{p1} q_{33} & q_{24} - y^{p1} q_{34} \end{bmatrix} \quad (23)$$

SVD of M (Equation (24) below) can be used to solve for the vector $x^w$ (Equation (25) below) wherein the four elements of the last column of V are the homogenous coordinates.

$$M = UDV^T \quad (24)$$

$$x^w = \begin{bmatrix} x^w \\ y^w \\ z^w \\ 1 \end{bmatrix} \quad (25)$$

As discussed above, the 3D points obtained through collaboration may be used to refine and update the local projection matrix via re-calibration. The projection matrix may be factored into intrinsic and extrinsic parameters of the local camera to adjust the synthetic viewpoint, $$\begin{bmatrix} w^1 x^{p1} \\ w^1 y^{p1} \\ w^1 \end{bmatrix} = \begin{bmatrix} p_{11} & p_{12} & p_{13} & p_{14} \\ p_{21} & p_{22} & p_{23} & p_{24} \\ p_{31} & p_{32} & p_{33} & p_{34} \end{bmatrix} \begin{bmatrix} x^w \\ y^w \\ z^w \\ 1 \end{bmatrix} \quad (26)$$

$$\begin{bmatrix} wx \\ wy \\ w \end{bmatrix} = \begin{bmatrix} f_x & f_z & u_0 \\ 0 & f_y & v_0 \\ 0 & 0 & 1 \end{bmatrix} \begin{bmatrix} r_{11} & r_{12} & r_{13} & t_x \\ r_{21} & r_{22} & r_{23} & t_y \\ r_{31} & r_{32} & r_{33} & t_z \end{bmatrix} \begin{bmatrix} x^w \\ y^w \\ z^w \\ 1 \end{bmatrix} \quad (27)$$

Compactly, $$\begin{bmatrix} wx \\ wy \\ w \end{bmatrix} = K[R | t] \begin{bmatrix} x^w \\ y^w \\ z^w \\ 1 \end{bmatrix} \quad (28)$$

In Equation (28), K is the intrinsic matrix which contains focal lengths and image plane origin offsets, R is the rotation matrix, and t is the translation vector.

The projection matrix can be expressed as, $$P = \begin{bmatrix} p_{11} & p_{12} & p_{13} & p_{14} \\ p_{21} & p_{22} & p_{23} & p_{24} \\ p_{31} & p_{32} & p_{33} & p_{34} \end{bmatrix} = [M | p_4] \quad (29)$$

K and R can be obtained from the projection matrix by applying QR decomposition to the inverse of M, $$M^{-1} = QU \quad (30)$$

Inverting both sides of Equation (30), $$M = (QU)^{-1} = U^{-1} Q^{-1} \quad (31)$$

$Q^{-1}$ can be interpreted as the rotation matrix R, and $U^{-1}$ can be interpreted as the intrinsic matrix K after dividing each element by [$U^{-1}$ by $U^{-1}$] (a 3,3 matrix) to give $\check{U}^{-1}$.

The translation vector can be obtained by noting, $$Kt = p_4 \quad (32)$$

Solving for the translation vector using the estimated intrinsic matrix, $$t = \check{U} p_4 \quad (33)$$

After the intrinsic and extrinsic camera parameters have been estimated, incremental synthetic views may be obtained by adjusting the camera focal length to give zoom, rotating the rotation matrix to give pan and tilt, and adjusting the translation vector to move the viewpoint center in 3D space. Alternatively, a display projection matrix may be constructed for any desired viewpoint and field-of-view by calculating the required projection matrix.

Figure 2:
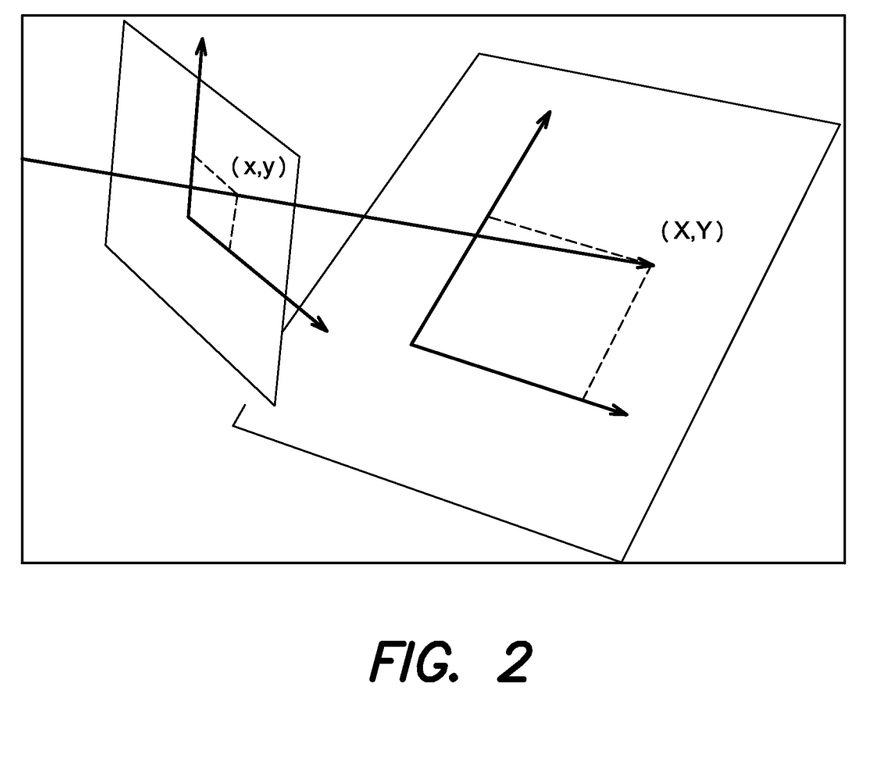
FIG. 2 is a diagram illustrating mapping from image coordinates to world coordinates according to aspects of the invention.

According to one embodiment the perspective transform may be simplified to map the image plane into a world plane, as shown in FIG. 2. This simplification may be useful for mapping the image onto planar surfaces, such as game fields, stages, roads, etc., by setting one dimension, usually the z-coordinates, of the world field to zero. In this case, only four correspondences are needed to solve for the projection matrix instead of a minimum of six for the non-planar case. Once the projection matrix is solved, all of the planar image pixels can be projected to world coordinates and then viewed from any 3D synthetic camera location by computing display projection matrices to create the image from the desired viewpoint. This is illustrated by the following equations.

Setting the z-coordinates to zero in Equation (16) and moving the last column to the right side, $$\begin{bmatrix} x^w & y^w & 1 & 0 & 0 & 0 & -x^{p1}x^w & -x^{p1}y^w \\ 0 & 0 & 0 & x^w & y^w & 1 & -y^{p1}x^w & -y^{p1}y^w \\ \vdots & \vdots & \vdots & \vdots & \vdots & \vdots & \vdots & \vdots \\ x_n^w & y_n^w & 1 & 0 & 0 & 0 & -x_n^{p1}x^w & -x_n^{p1}y_n^w \\ 0 & 0 & 0 & x_n^w & y_n^w & 1 & -y^{p1}x_n^w & -y_n^{p1}y_n^w \end{bmatrix} \begin{bmatrix} p_{11} \\ p_{12} \\ \vdots \\ p_{33} \end{bmatrix} = \begin{bmatrix} x^{p1} \\ y^{p1} \\ \vdots \\ x_n^{p1} \\ y_n^{p1} \end{bmatrix} \quad (34)$$

Or compactly, $$Cp = c, \quad (35)$$

In Equation (35), for the simplified planar case, the p vector, when reshaped, maps the world coordinates to the homogenous image plane coordinates according to:

$$\begin{bmatrix} w^1 x^{p1} \\ w^1 y^{p1} \\ w^1 \end{bmatrix} = \begin{bmatrix} p_{11} & p_{12} & p_{13} \\ p_{21} & p_{22} & p_{23} \\ p_{31} & p_{32} & p_{33} \end{bmatrix} \begin{bmatrix} x^w \\ y^w \\ 1 \end{bmatrix} \quad (36)$$

The inverse transformation maps the image plane to homogenous world coordinates, $$\begin{bmatrix} zx^w \\ zy^w \\ z \end{bmatrix} = \begin{bmatrix} p'_{11} & p'_{12} & p'_{13} \\ p'_{21} & p'_{22} & p'_{23} \\ p'_{31} & p'_{32} & p'_{33} \end{bmatrix} \begin{bmatrix} x^{p1} \\ y^{p1} \\ 1 \end{bmatrix} \quad (37)$$

The inverse projection matrix coefficients can be found by solving, $$\begin{bmatrix} x^{p1} & y^{p1} & 1 & 0 & 0 & 0 & -x^{p1}x^w & -x^{p1}y^w \\ 0 & 0 & 0 & x^w & y^w & 1 & -y^{p1}x^w & -y^{p1}y^w \\ \vdots & \vdots & \vdots & \vdots & \vdots & \vdots & \vdots & \vdots \\ x_n^{p1} & y_n^{p1} & 1 & 0 & 0 & 0 & -x^{p1}x^w & -x_n^{p1}y_n^w \\ 0 & 0 & 0 & x_n^{p1} & y_n^{p1} & 1 & -y^{p1}x_n^w & -y_n^{p1}y_n^w \end{bmatrix} \begin{bmatrix} p'_{11} \\ p'_{12} \\ \vdots \\ p'_{33} \end{bmatrix} = \begin{bmatrix} x_1^w \\ y_1^w \\ \vdots \\ x_n^w \\ y_n^w \end{bmatrix} \quad (38)$$

Or compactly, $$A p' = b, \quad (39)$$

p' can be solved using SVD techniques or a pseudo-inverse process, and then reshaped to form a projection matrix to map image pixels to world planes using Equation (29). The matrix A and vector b can be constructed as shown in Equation (38) for a given set of n image plane points and corresponding world plane coordinates, and the image coordinates may be mapped to world coordinates using Equation (27).

Figure 3:
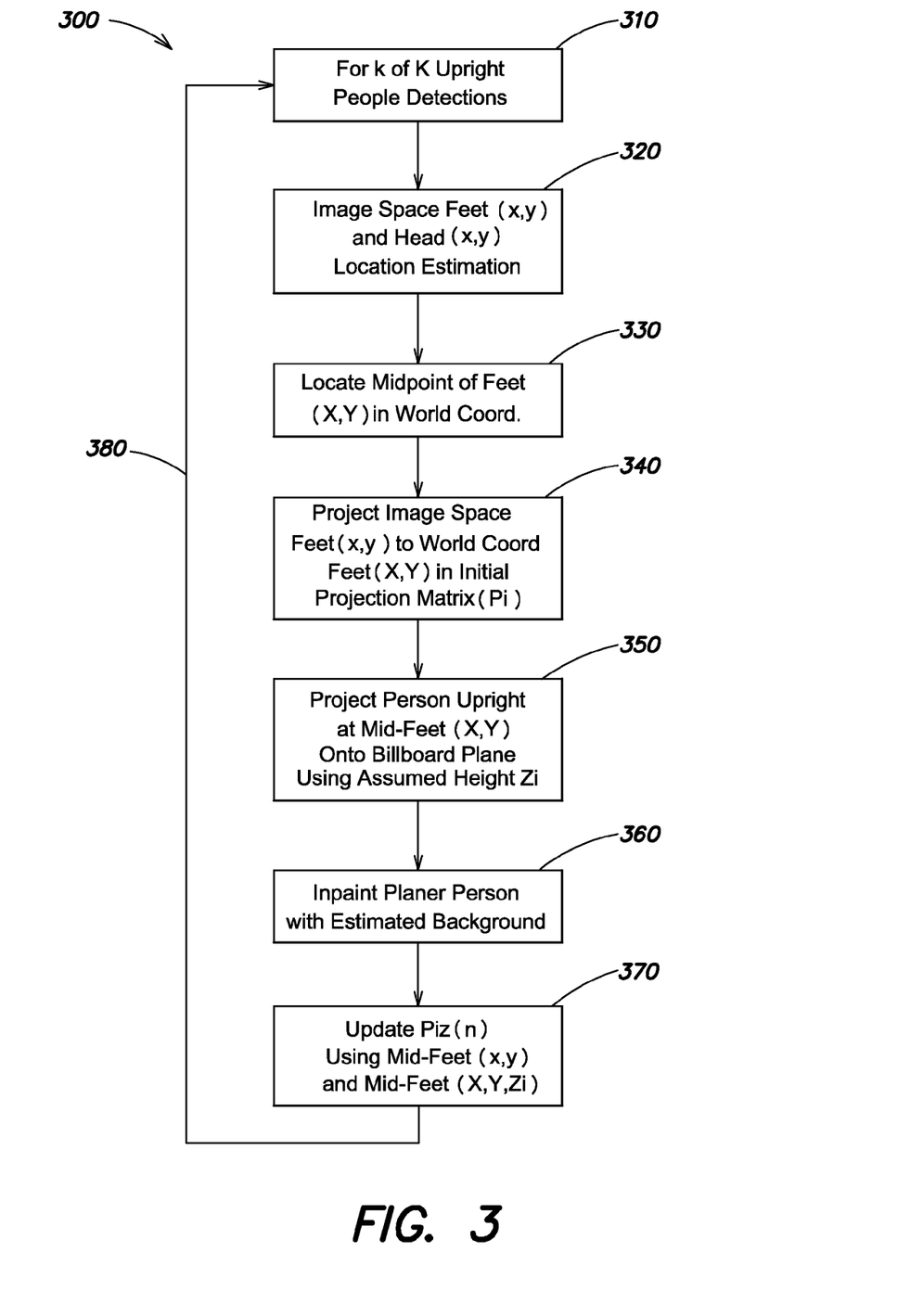
FIG. 3 is a flow diagram of one example of a process of producing a single-camera 3D projection using an initial planar projection matrix, according to aspects of the invention.

As discussed above, according to one embodiment, vertical distortion in a 3D reconstruction may be removed by computing the world coordinates of the intersection of the vertical object with the surface using the projection matrix and estimated heights of the vertical object. In one example, the vertical object is segmented and projected onto a vertical plane using an assumed height. FIG. 3 is a flow diagram for one example of a method of single-camera 3D projection of people using the initial planar projection matrix which may be calculated as explained above. In the example of FIG. 3, for each detected upright person the location of the feet is used to project a segmented image chip of the person onto a vertical plane to give a 3D "billboard" representation. Although the example of FIG. 3 relates to persons, those skilled in the art will appreciate, given the benefit of this disclosure, that the method may be adapted for vertical objects other than people by selecting an appropriate object feature (rather than the feet of a person) and using an appropriate estimated height given knowledge of typical attributes of the object.

Referring to FIG. 3, the process 300 begins at step 310 and may be performed for each person (k) of K detected upright people. At step 320, image processing techniques may be used to estimate the image space coordinates (x,y) of the $k^{th}$ person's feet and head. At step 330, the midpoint of the feet is estimated in world coordinates (X,Y). At step 340, the location of the image space feet (x,y) may be mapped projected or mapped into world coordinates of the feet (X,Y), for example, by using the initial projection matrix Pi and process discussed above with reference to FIG. 2. The $k^{th}$ person may then be projected upright at the estimated mid-feet position (found in step 330) onto a "billboard" plane using an assumed height Zi (step 350). At step 360, the planar person is in-painted with estimated background pixels to remove "dead space" in the projected image and to make the projection appear more realistic. At step 370, the initial projection matrix Pi may be updated, to provide an updated projection matrix Pz, using the image space coordinates of the mid-feet location (x,y) and the world coordinates of the mid-feet location (X,Y,Zi). The process may be repeated (as indicated by arrow 380) for each of the K persons imaged in the scene. Thus, using either received or pre-programmed information about the imaged persons (e.g., height estimates, etc.) and the equations and process discussed above, a 3D reconstruction may be obtained from the single-camera images of a scene.

As discussed above, the 3D projections and synthetic viewpoints produced with any one user's camera device may be augmented and improved using information received from other cameras. For example, synthetic viewpoints that allow the user to "see" through obstructions or around corners may be achieved by integrating 3D projection information from other cameras that are positioned differently (e.g., on the other side of or inside the obstruction) and therefore have different views of the scene. As discussed above, unlike conventional multi-view 3D reconstruction techniques, aspects and embodiments allow for the sharing of image information that does not necessarily include complete photographic frames. For example, the local initial refined projection matrix may be broadcast to other users in a 3D collaborative network along with metadata that facilitates the use of the projection matrix by receiving applications on other camera devices. The metadata may include information such as timestamps, positions, and image descriptors of detected objects, for example. Participants in the 3D collaborative network receive projection matrices from other cameras which enables them to improve their own estimate of 3D information and improve their own projection matrix to yield an updated 3D projection matrix which may then be streamed back out to all network participants. In one example, occlusions (such as obstructions 150 in FIG. 1) are detected when received descriptors do not match locally computed descriptors. In this case, the local view may be rendered partially transparent, and the remote view is adjusted to match the local viewpoint. This technique enables users to choose the synthetic camera viewpoint most useful to them.

Figure 4:
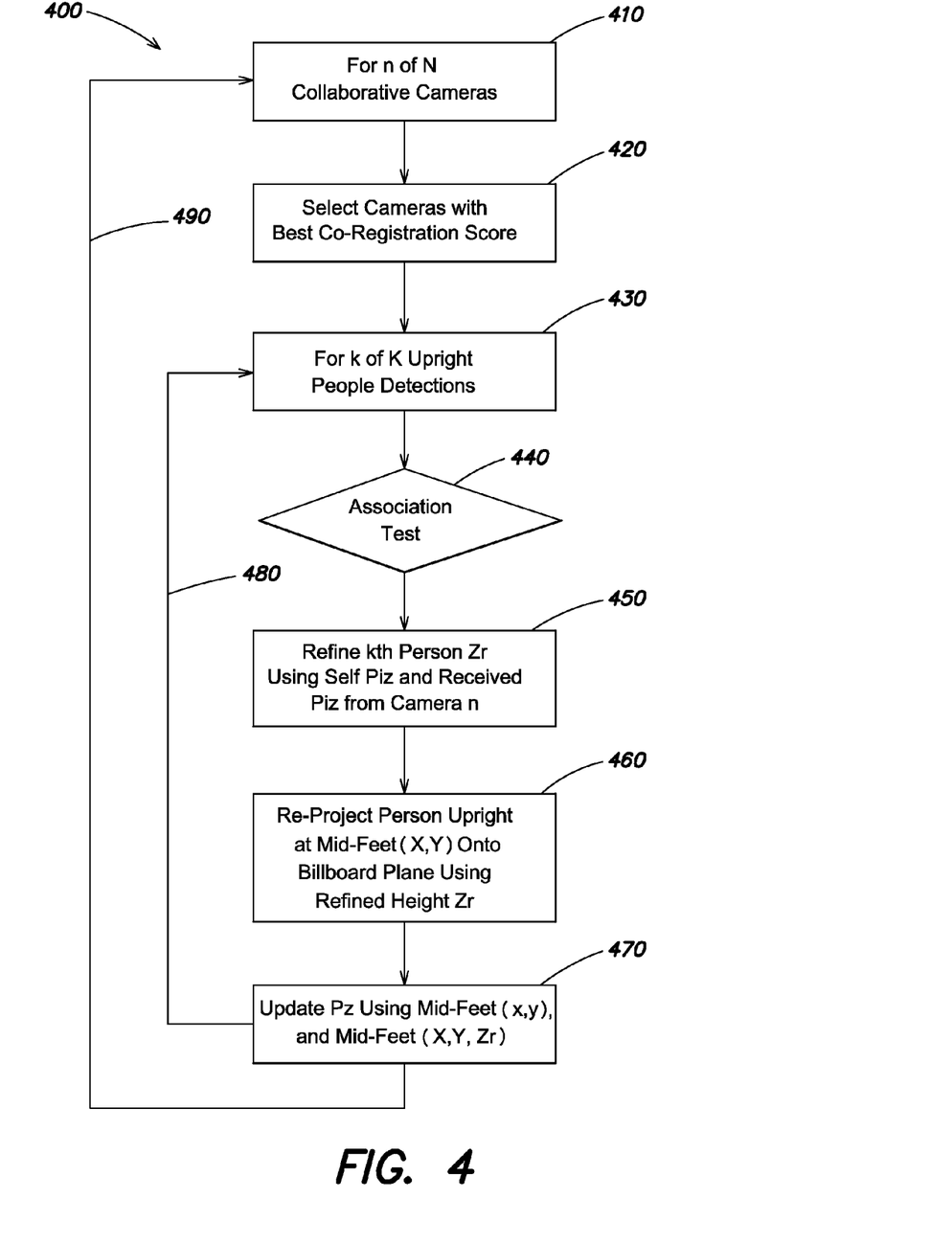
FIG. 4 is a flow diagram of one example of a process of dynamically sharing projection matrices and estimated information among a network of collaborators to refine and enhance the projection matrices and estimated information, according to aspects of the invention.

FIG. 4 is a flow diagram illustrating one example of a process of sharing of projection matrices to improve 3D points and calibration.

Referring to FIG. 4, the process 400 begins at step 410 and may be repeated for each camera (n) of N collaborative cameras. At step 420, one or more cameras having good co-registration scores are selected for processing. According to one embodiment, the co-registration score is computed by comparing the intersection of each camera's estimated area-of-regard (AOR) using pixels as the unit of area measurement. Estimated AOR in world coordinates is obtained by combining the camera's position, orientation, and field-of-view (FOV). Position may be obtained through a variety of means including GPS, for example. Orientation is commonly available in smart-phones or similar devices using onboard accelerometers and/or a magnetic sensor. FOV is obtained from the camera sensor. In one embodiment, the estimated AOR is expressed as a polygon. The AOR polygon has four corners for the simple case of obstruction-free viewing of the earth. Modifications to the AOR polygon may be made to handle exceptions such as an AOR that includes the sky, obstructions such as buildings or other objects, for example. The modifications may require the AOR polygon to possess more than four vertices.

In one embodiment, each camera broadcasts its current estimated position, orientation, FOV, and resolution (in pixels). Each camera computes the intersection of its own AOR polygon with all other AOR polygons. The units of area are the number of foreign pixels in the intersection region. This process involves mapping each pixel to a point in the intersection AOR, which may be accomplished using known pixel projection algorithms.

The following process steps may then be performed for each person (k) of K imaged people in the scene (step 430; similar to process 300 described above).

At step 440 an association test is performed. According to one embodiment, the association test compares semantic labels at estimated locations in the scene at the same time instant. If the same semantic label, e.g. an upright human, is found at the same location in the AOR at the same time instant, then the association test succeeds. The spatial location must match to within a specified spatial tolerance threshold. The time instant must match to within a specified temporal threshold. The semantic-based association test overcomes problems associated with conventional photogrammetry by eliminating that the same visual features be detected in both views. The semantic association test enables two cameras to produce a 3D output with extreme angle separation that would be impossible using conventional feature association methods. The semantic approach succeeds where image-based feature association fails because the label of the object persists between two views that have no common image features.

Upon satisfactory results of the association test, the system proceeds to step 450, wherein the height estimate of the $k^{th}$ person is refined (producing a refined height estimate Zr from the initial assumed height Zi) using the local projection matrix (Pi or Pz) as well as one or more projection matrices Piz received from the selected other camera(s). At step 460, the $k^{th}$ person is reprojected upright at the world coordinate mid-feet location (X,Y) onto the billboard plane using the refined height Zr (similar to step 350 discussed above). The local projection matrix Pz may then be further updated (step 470) using the image space coordinates of the mid-feet location (x,y) and the world coordinates of the mid-feet location (X,Y,Zr), similar to step 370 discussed above. This process may be repeated for each person of the K imaged persons (as indicated by arrow 480), and for each camera n of N collaborative cameras (as indicated by arrow 490).

The above processes and techniques may be programmed, using any suitable computer programming language, to provide an application that can be installed and executed on a user's camera device (e.g., a smartphone). Any mobile phone or similar device equipped with a camera and communication capability can be configured to start the application. According to one embodiment, the application scans a set of control channel ports for activity. If no activity is found then the initiator (user) may be instructed to begin acquiring images or video of the event, and the application may process the images/video and begin broadcasting information (e.g., features extracted from the scene, the projection matrix, and/or associated metadata) on a first available multicast control channel.

Figure 5:
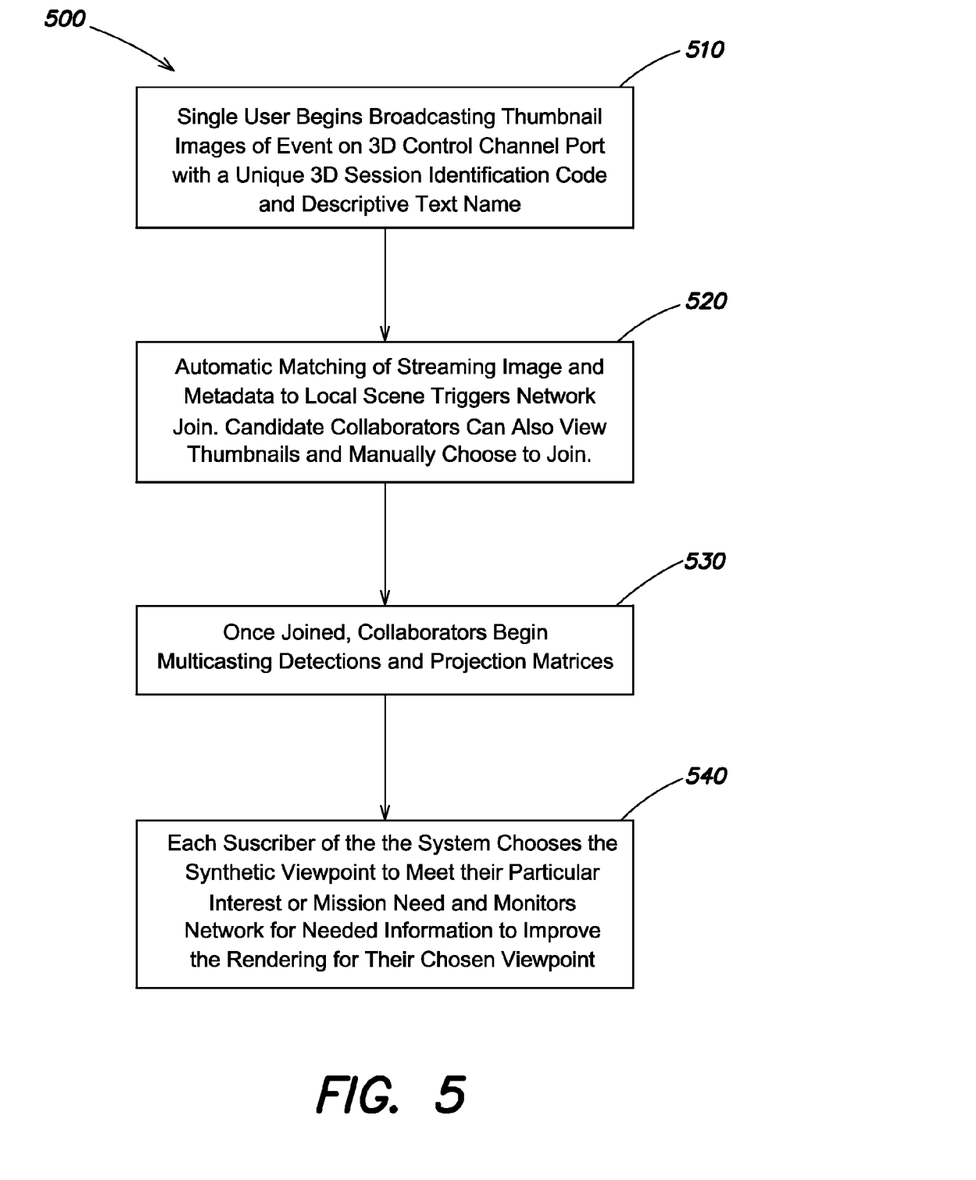
FIG. 5 is a flow diagram of one example of a process for forming a collaboration network according to aspects of the invention.

FIG. 5 is a flow diagram of one example of a method 500 of forming a collaboration network according to certain embodiments. At step 510, a user begins broadcasting information on an available multicast/3D control channel port. As discussed above, this information may include features extracted from the scene. If available, the features may be tagged with camera coordinates and orientation. In addition, in certain embodiments, representative scene overview thumbnails are periodically also sent. The broadcast information may further include a unique 3D session identification code and optionally a descriptive text name. This information may allow users/applications to differentiate between different collaboration networks formed around different events. At step 520, one or more additional users (collaborators) may join the collaboration network established by the initiating user. In one example, when a user starts the application on their camera device, the application may perform automatic evaluation of streamed images and metadata, and a match with local scene information may trigger the application to automatically join the network. For example, a collaborator application may scan the available control channels, and compare local coordinates with those on the control channel for a matching event overlap. If coordinates and orientations are not available, the application may compare collected scene features with the control channel features to find a match. In another example, candidate collaborators may view the streamed thumbnails of the event and manually select to the join the network based on the representative scenes. However, this manual intervention is not necessary for automatic camera operations.

Once they have joined the network, collaborators may begin multicasting (or broadcasting) information associated with the event, including their projection matrices, as discussed above (step 530). In certain examples, each contributor to the network adds metadata to the streaming information to include at a minimum timestamps, and if possible, GPS coordinates, and camera orientation. As discussed in more detail below, the application may be configured to display any one or more of several different synthetic viewpoints based on the 3D projection information locally produced and received over the network. At step 540, each collaborator in the network may select a synthetic viewpoint for display on their local device that meets their own particular interest or need. Collaborators (or the application automatically) may monitor the network for additional information from other devices that can be used to improve the rendering of their own selected viewpoint.

As discussed above, the initiating user (or any other collaborator) does not require any collaborators to achieve a 3D effect. For example, the ability to provide a single-camera 3D projection using initial planar projections is discussed above. However, collaborators may improve the result by providing additional information.

The ability to synthesize a viewpoint from 3D calculations may provide significantly more utility if the synthetic viewpoint may be tailored to meet a user's particular need or interest. According to certain embodiments, the techniques discussed above may be employed to render 3D projections into any of a variety of viewpoint selections or "modes". Some examples of viewpoints include a plan view, a "through-the-wall" view, a 360-degree target inspection view, a viewpoint matches that of a target, rather than the user (referred to as a "target viewpoint", a curation or choreographed viewpoint, and a 3D browsing mode, each of which is discussed in more detail below. Each viewpoint or mode may provide the user with different information. The user may quickly switch between modes to rapidly ascertain needed information. In certain examples, multiple modes may be simultaneously engaged (e.g. the plan view mode and the through-the-wall mode) for increased situational awareness utility.

Figure 6:
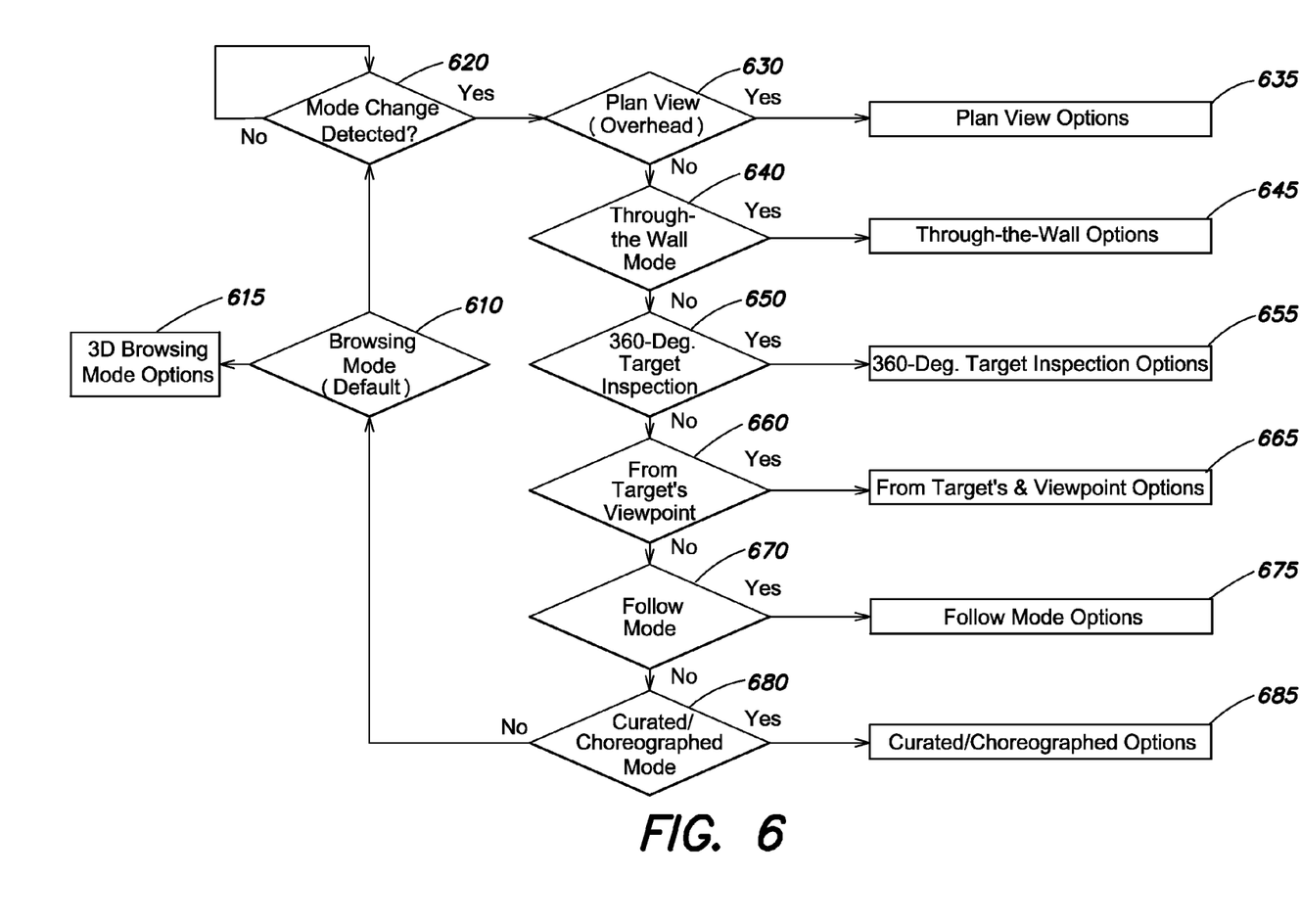
FIG. 6 is a flow diagram of one example of a process of viewpoint/mode selection according to aspects of the invention.

FIG. 6 is a flow diagram of one example of a synthetic viewpoint or mode selection process according to certain embodiments. After the application is started on the user's camera device, the user may select one or more the available synthetic viewpoints or modes for display. When a viewpoint/mode is selected, the application may configure the display of the camera device to display the features or options associated with that mode. In one example, the 3D browsing mode 610 is the default mode. Thus, the options 615 associated with this mode will be displayed if the user does not select a different mode. In this default browsing mode, the associated default synthetic viewpoint is selected to be coincident with the user's natural viewpoint. The application may monitor for inputs from the user indicating a mode change (step 620). If no mode change indication is detected, the display may continue to display the current viewpoint. The user may select a new synthetic viewpoint through a variety of ways. For example, when the user changes the synthetic viewpoint to be nearly overhead, the system may automatically switch to the plan view mode 630. When the user directs the camera viewpoint towards an obstruction, the system may automatically switch to the through-the-wall mode 640 to reveal occluded detections of interest. When the user zooms in on a target, the system may prompt user to indicate whether the 360-degree target inspection mode 650 is desired. Thus, the user may manually select a desired synthetic viewpoint and associated mode, and/or the system may automatically select or offer a mode and associated synthetic viewpoint based on other actions taken by the user or on the camera's orientation and/or field of view.

In one embodiment, in the plan view mode 630, the system displays symbols of detected humans (or other objects) and cameras on a map. In some circumstances, the plan view mode 630 may be the most useful for situational awareness, even though it may be considered the least photo-realistic and the least three-dimensional. Referring again to FIG. 1, in one embodiment, the plan view mode options 635 may include options to display only detected humans 140 (or other preselected objects) inside the event boundaries 130, or to display also the estimated locations of the cameras 120 based either on resection or from contributed coordinates and orientation angles. The image background may be pure symbology including map information and event boundaries. Alternatively, the image background may be rendered to represent the event from an orthographic viewpoint.

The through-the-wall mode 640 may provide great utility in a variety of situations. According to one embodiment, in the corresponding synthetic viewpoint, an obstruction is rendered semi-transparent using an alpha mask, and symbols of detected objects are displayed. The process of alpha compositing, in which an image is combined with a background to create the appearance of partial or full transparency, is well understood in the art of computer graphics. An alpha mask associated with each image element is used in this process to allow the image elements to be combined correctly. The alpha mask contains coverage information (the shape of the geometry being drawn) such that one can distinguish between parts of the image where the geometry was actually drawn and other parts of the image which are empty. For example, the alpha mask may contain, for each pixel, a value between 0 and 1, where a value of 0 means that the pixel does not have any coverage information and is transparent (there was no color contribution from any geometry because the geometry did not overlap this pixel), and a value of 1 means that the pixel is opaque because the geometry completely overlapped the pixel.

Through-the-wall mode options 645 may include, in order of increasing communication load, to render detected objects in a silhouette mode or in full appearance. In either case, the perspective point-of-view may be adjusted to be consistent with user's viewpoint. For example, a user viewing a street may be unable to see cross-street activity due to blockage of buildings. Provided that information from collaborative cameras positioned on the other side of the blocking building, the through-the-wall mode may enables the user to "see" through the building by rendering the building semi-transparent and adjusting the collaborator camera's video to be consistent with the user's viewpoint. Similarly, security personnel may use this mode to intuitively perceive what is inside a building because interior video may been transformed to be consistent with their viewpoint and the door/building walls rendered semi-transparent. As discussed above, conventional solutions require the person to mentally interpret the remote camera's viewpoint relative to the person's own position, which can be difficult and taxing especially in stressful situations. Additionally, conventional solutions do not render the blockage partially invisible using an alpha mask. This mode may also be useful for motorists. For example, the mode may be used to provide motorists with a view of what would otherwise be blocked from view (e.g., cyclists, other vehicles, pedestrians, etc.). Street cameras may be automatically detected and joined to the network to provide the necessary video to produce imagery of the objects otherwise blocked from the motorist's field of view. In some examples, the imagery may be displayed on a head-up display located in the motorist's vehicle.

The 360-degree target inspection mode 650 and associated options 655 may provide the user with the ability to "zoom in" on a target object of interest and virtually circle the target to inspect it from different sides. In one example, this mode may be activated by the user pointing the local camera device toward, and focusing on, an object of interest and requesting (e.g., by voice or touch command) the 360-degree inspection. In certain examples, the 360-degree inspection may be carried out in real time while collected video is being displayed and transformed into the world coordinates. The 360-degree mode is available even if no collaborators are available to augment the rendering, but in this case the target is rendered onto a vertical plane. When collaborators contribute their information, the target can be rendered with more three dimensional detail, as discussed above.

The target viewpoint mode 660 and associated options 665 may provide the user with the ability to observe a scene from the point of view of a target object. The synthetic viewpoint created using the above-described processes may be from any location. Accordingly, an estimate of what a target object can "see" can be obtained.

The follow mode 670 may allow a user to track a designated object of interest at it moves through a scene. Tracking of the dynamic action of a moving target and its surroundings may be achieved by assigning the synthetic viewpoint to be offset from the moving target. The options 675 associated with this mode may include the ability to combine this mode with another mode. For example, it may be particularly useful to combine the follow mode 670 with the through-the-wall mode 640 to transition between different collaborating cameras when target moves between cameras. For example, security personnel may use the combination of modes to track a moving person who moves into a building. Surveillance cameras, or volunteer mobile phone cameras, for example, may be dynamically joined to the network including the security personnel's camera(s) to enable synthetic viewing inside the building even while the security personnel remain outside, thereby providing continuous coverage without disruption as the person moves.

The curation/choreographed mode 680 and associated options 685 involve a controlling computer and/or operator that monitors and collects the collaborative activity and produces a particular synthetic viewpoint that meets certain characteristics. For example, for entertainment performances, the rendered synthetic viewpoint may be one that is most pleasing to audiences. For sporting events, for example, the rendered synthetic viewpoint may be one that follows play action of interest. For tactical operations, for example, the rendered synthetic viewpoint may be one that focuses on threat activity. According to certain embodiments, curation is similar to choreographing, except that it occurs post-event. For example, the controlling computer and/or operator, may collect and record available transmitted information corresponding to a certain event, and later produce one or more synthetic views that best illustrate the event in accord with certain goals or needs (e.g., to provide a summary of particular plays of interest after a sporting event).

Thus, aspects and embodiments provide systems and methods that allow users to collaboratively produce multi-view augmented reality video to enhance situational awareness through the use of synthetic viewpoints and special visualizations. Users may collaboratively share information to render viewed scenes into a 3D format that is augmented by information from other views with minimal computation and communication burden. As discussed above, although the 3D rendering may be improved when specific auxiliary information from other views is exchanged, initial 3D rendering is not dependent on receipt of the auxiliary information and may be created from a single view without using the techniques usually associated with 3D reconstruction. In particular, the 3D reconstruction may operate at the object level, not the pixel level, and therefore does not require common pixels of the object to be located in different views. The techniques discussed above allow users to select from multiple synthetic viewpoints, including those that may provide the effect of seeing through obstructions. This may be achieved by rendering the 3D information on the user's display to the desired viewpoint and then using an alpha mask to make blockages transparent or semi-transparent. The effect may be used to "see" inside any object that has available 3D internal information. For example, security personnel may track activity inside a building and maintain understanding with respect to outside of the building by using cut-away views. As discussed above, conventional attempts to use video to see around corners do not adjust the viewpoint to be coincident with the user, or render the blockage invisible using an alpha mask.

As discussed above, aspects and embodiments use automatic detection of context to interpret lines and markings of certain scenes, such as roads, stages, courts, and playing fields, for example. This approach is not present in conventional systems that attempt to create monocular 3D effects. Furthermore, production of calibrated views allows for the insertion of "virtuals" such as advertisements or advisories in a geometrically consistent manner. Additionally, unlike conventional systems for forming 3D video, in which contributors are required to send complete images to a server, certain aspects and embodiments provide contributors with the ability to dynamically network amongst one another to spontaneously form a 3D information stream between users to maximally benefit all participants.

Figure 7:
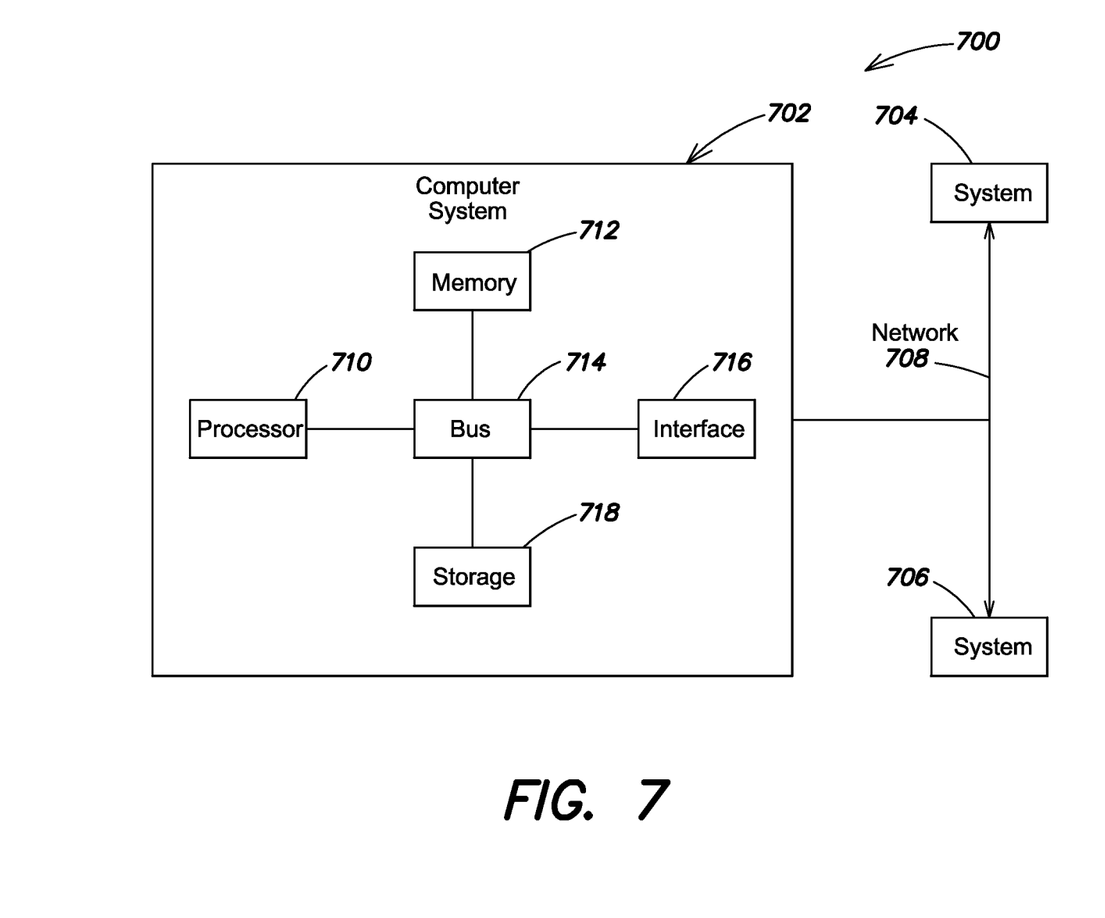
FIG. 7 is a block diagram of one example of a computer system on which aspects and embodiments of the present invention may be implemented.

FIG. is a block diagram of a distributed computer system 700, in which various aspects and functions discussed above may be practiced. The distributed computer system 700 may include one or more computer systems. For example, as illustrated, the distributed computer system 700 includes three computer systems 702, 704 and 706. As shown, the computer systems 702, 704 and 706 are interconnected by, and may exchange data through, a communication network 708. The network 708 may include any communication network through which computer systems may exchange data. To exchange data via the network 708, the computer systems 702, 704, and 706 and the network 708 may use various methods, protocols and standards including, among others, token ring, Ethernet, Wireless Ethernet, Bluetooth, radio signaling, infra-red signaling, TCP/IP, UDP, HTTP, FTP, SNMP, SMS, MMS, SS7, JSON, XML, REST, SOAP, CORBA IIOP, RMI, DCOM and Web Services.

According to some embodiments, the functions and operations discussed for producing a three-dimensional synthetic viewpoint can be executed on computer systems 702, 704 and 706 individually and/or in combination. For example, the computer systems 702, 704, and 706 support, for example, participation in a collaborative network. In one alternative, a single computer system (e.g., 702) can generate the three-dimensional synthetic viewpoint. The computer systems 702, 704 and 706 may include personal computing devices such as cellular telephones, smart phones, tablets, "fablets," etc., and may also include desktop computers, laptop computers, etc.

Various aspects and functions in accord with embodiments discussed herein may be implemented as specialized hardware or software executing in one or more computer systems including the computer system 702 shown in FIG. 7. In one embodiment, computer system 702 is a personal computing device specially configured to execute the processes and/or operations discussed above. As depicted, the computer system 702 includes at least one processor 710 (e.g., a single core or a multi-core processor), a memory 712, a bus 714, input/output interfaces (e.g., 716) and storage 718. The processor 710, which may include one or more microprocessors or other types of controllers, can perform a series of instructions that manipulate data. As shown, the processor 710 is connected to other system components, including a memory 712, by an interconnection element (e.g., the bus 714).

The memory 712 and/or storage 718 may be used for storing programs and data during operation of the computer system 702. For example, the memory 712 may be a relatively high performance, volatile, random access memory such as a dynamic random access memory (DRAM) or static memory (SRAM). In addition, the memory 712 may include any device for storing data, such as a disk drive or other non-volatile storage device, such as flash memory, solid state, or phase-change memory (PCM). In further embodiments, the functions and operations discussed with respect to generating and/or rendering synthetic three-dimensional views can be embodied in an application that is executed on the computer system 702 from the memory 712 and/or the storage 718. For example, the application can be made available through an "app store" for download and/or purchase. Once installed or made available for execution, computer system 702 can be specially configured to execute the functions associated with producing synthetic three-dimensional views.

Computer system 702 also includes one or more interfaces 716 such as input devices (e.g., camera for capturing images), output devices and combination input/output devices. The interfaces 716 may receive input, provide output, or both. The storage 718 may include a computer-readable and computer-writeable nonvolatile storage medium in which instructions are stored that define a program to be executed by the processor. The storage system 718 also may include information that is recorded, on or in, the medium, and this information may be processed by the application. A medium that can be used with various embodiments may include, for example, optical disk, magnetic disk or flash memory, SSD, among others. Further, aspects and embodiments are not to a particular memory system or storage system.

In some embodiments, the computer system 702 may include an operating system that manages at least a portion of the hardware components (e.g., input/output devices, touch screens, cameras, etc.) included in computer system 702. One or more processors or controllers, such as processor 710, may execute an operating system which may be, among others, a Windows-based operating system (e.g., Windows NT, ME, XP, Vista, 7, 8, or RT) available from the Microsoft Corporation, an operating system available from Apple Computer (e.g., MAC OS, including System X), one of many Linux-based operating system distributions (for example, the Enterprise Linux operating system available from Red Hat Inc.), a Solaris operating system available from Sun Microsystems, or a UNIX operating systems available from various sources. Many other operating systems may be used, including operating systems designed for personal computing devices (e.g., iOS, Android, etc.) and embodiments are not limited to any particular operating system.

The processor and operating system together define a computing platform on which applications (e.g., "apps" available from an "app store") may be executed. Additionally, various functions for producing a three-dimensional synthetic view may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed components, or any combination thereof. Thus, the invention is not limited to a specific programming language and any suitable programming language could also be used.

Although the computer system 702 is shown by way of example as one type of computer system upon which various functions for producing three-dimensional synthetic views may be practiced, aspects and embodiments are not limited to being implemented on the computer system, shown in FIG. 7. Various aspects and functions may be practiced on one or more computers or similar devices having different architectures or components than that shown in FIG. 7.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of producing a three-dimensional (3D) synthetic viewpoint of a scene, the method comprising:
   receiving an image of the scene from a single local camera, the image including at least one vertical object;
   analyzing the image to determine a context of the scene and to extract at least one surface feature of the scene;
   developing an initial set of planar world coordinates for the image received from the single local camera based on the at least one surface feature to estimate an initial local perspective projection matrix;
   mapping image pixels of the image to a world plane to produce a synthetic viewpoint of the scene based on a 3D construction of the scene by using the initial local perspective projection matrix to map image space coordinates to world coordinates, wherein the synthetic viewpoint is a selectable synthetic viewpoint that is coincident with a user viewpoint of the single local camera;
   removing vertical distortion associated with the at least one vertical object by:
     computing world coordinates of an intersection of the at least one vertical object with a surface corresponding to the surface feature using the initial local perspective projection matrix, and based on the world coordinates of the intersection and an estimated height of the at least one vertical object, projecting the vertical object onto a vertical plane, wherein computing the world coordinates of the intersection includes:
       estimating image space coordinates of first and second features of the at least one vertical object, the first feature corresponding to the intersection of the at least one vertical object with the surface, estimating a midpoint of the first feature in world coordinates, and mapping the estimated image space coordinates of the first feature into world coordinates of the first feature using the initial local perspective projection matrix; and in-painting the at least one vertical object on a horizontal plane with estimated background pixels.

2. The method of claim 1, wherein projecting the at least one vertical object onto the vertical plane includes projecting the at least one vertical object upright at the estimated midpoint of the first feature in the world coordinates.

3. The method of claim 1, wherein the at least one vertical object is a person, and wherein estimating the image space coordinates of the first feature includes estimating the image space coordinates of feet of the person.

4. The method of claim 1, further comprising refining the initial local perspective projection matrix using image space coordinates of the midpoint of the first feature, the estimated world coordinates of the midpoint of the first feature, and the estimated height of the at least one vertical object to produce a refined local perspective projection matrix.

5. The method of claim 4, further comprising broadcasting the refined local perspective projection matrix.

6. The method of claim 4, further comprising:
receiving at least one remote perspective projection matrix from a remote device; and updating the refined local perspective matrix using the at least one remote perspective projection matrix.

7. The method of claim 6, wherein the method is performed at a local device having the user viewpoint of the scene, wherein the remote device has a second viewpoint of the scene different from the first viewpoint of the scene; and further comprising:
at the local device, producing an additional 3D synthetic viewpoint of the scene using the at least one remote perspective projection matrix received from the remote device, the additional 3D synthetic viewpoint including at least one object that is obstructed in the user viewpoint of the scene.

8. The method of claim 7, wherein receiving the at least one remote perspective projection matrix further includes receiving metadata associated with the at least one remote perspective projection matrix.

9. The method of claim 8, wherein receiving the metadata includes receiving at least one of a timing information, descriptors of detected objects in the scene, and a position of the remote device.

10. The method of claim 9, further comprising:
computing local descriptors of objects in the image of the scene; and
identifying an obstruction in the image of the scene based on the received descriptors of detected objects being different than the computed local descriptors.

11. The method of claim 10, further comprising processing the additional 3D synthetic viewpoint of the scene to render the obstruction at least partially transparent.

12. The method of claim 1, further comprising displaying the synthetic viewpoint of the scene on a display associated with the single local camera.

13. A method of collaboratively forming three-dimensional (3D) synthetic viewpoints of a scene comprising:
obtaining a plurality of images of the scene with a corresponding plurality of cameras; at each of the plurality of cameras, producing a local 3D projection matrix;
broadcasting the local 3D projection matrix and associated metadata from each of the plurality of cameras to provide a corresponding plurality of broadcast data sets, wherein, for each camera of the plurality of cameras, the associated metadata includes an estimated position of the camera, an orientation of the camera, a field of view of the camera, and a resolution of the camera;
for at least one of the plurality of cameras: receiving the plurality of broadcast data sets;
selecting at least one of the broadcast data sets, wherein selecting the at least one of the broadcast data sets includes determining a co-registration score between the at least one of the plurality of cameras and the camera associated with each of the plurality of broadcast data sets, and selecting the at least one of the broadcast data sets based on the co-registration score;
processing the local 3D projection matrix and the at least one of the broadcast data sets to produce an updated 3D projection matrix; and processing the image of the scene obtained by the at least one of the plurality of cameras using the updated 3D projection matrix to produce a synthetic viewpoint of the scene based on a 3D construction of the scene, wherein the synthetic viewpoint is a selectable synthetic viewpoint that is coincident with a user viewpoint of the at least one of the plurality of cameras.

14. The method of claim 13, further comprising broadcasting the updated 3D projection matrix.

15. The method of claim 13, wherein processing the image of the scene includes mapping image pixels of the image to a world plane to produce the synthetic viewpoint of the scene by using the updated 3D projection matrix to map image space coordinates to world coordinates.

* * * * *